United States Patent [19]

Greenberg

[11] Patent Number: 5,294,449
[45] Date of Patent: Mar. 15, 1994

[54] COMPOSITION OF ANTI-CAVITY CHEWING GUM AND METHOD OF FIGHTING TOOTH DECAY BY USING ERYTHROSE AS ANTICARIES AGENT

[75] Inventor: Michael J. Greenberg, Northbrook, Ill.

[73] Assignee: Wm. Wrigley Jr. Company, Chicago, Ill.

[21] Appl. No.: 866,999

[22] Filed: Apr. 9, 1992

[51] Int. Cl.$^5$ .................................................. A23G 3/30
[52] U.S. Cl. ......................................... 426/3; 424/48; 424/440; 426/658; 426/804
[58] Field of Search .................................. 426/3-6, 426/658, 804; 424/58, 48, 440, 441, 673, 675, 195.1

[56] References Cited

U.S. PATENT DOCUMENTS

| | | | |
|---|---|---|---|
| 2,289,407 | 7/1942 | Boys | 99/135 |
| 3,429,716 | 2/1969 | Andrews | 99/150 |
| 3,497,590 | 2/1970 | Eigen | 424/55 |
| 3,629,395 | 12/1971 | Litchfield et al. | 424/48 |
| 3,651,206 | 3/1972 | Litchfield et al. | 424/48 |
| 3,679,792 | 7/1972 | Litchfield et al. | 424/48 |
| 3,749,766 | 7/1973 | Litchfield et al. | 424/48 |
| 4,048,299 | 9/1977 | Litchfield et al. | 424/49 |
| 4,053,638 | 10/1977 | Litchfield et al. | 424/333 |
| 4,060,602 | 11/1977 | Haas | 424/58 |
| 4,277,464 | 7/1981 | Reussner et al. | 424/177 |
| 4,374,122 | 2/1983 | Stroz et al. | 424/48 |
| 4,390,523 | 7/1983 | Huchette et al. | 424/48 |
| 4,457,921 | 7/1984 | Stroz et al. | 424/180 |
| 4,508,713 | 4/1985 | Stroz et al. | 514/60 |
| 4,518,581 | 5/1985 | Miyake et al. | 424/48 |
| 4,714,612 | 12/1987 | Nakamura et al. | 424/85 |
| 4,902,525 | 2/1990 | Kondou | 426/548 |
| 4,938,963 | 7/1990 | Parnell | 424/195.1 |
| 5,064,659 | 11/1991 | Greenberg et al. | 426/3 |
| 5,217,623 | 6/1993 | Greenberg et al. | 210/749 |

FOREIGN PATENT DOCUMENTS

| | | |
|---|---|---|
| 0009325A1 | 4/1980 | European Pat. Off. . |
| 0325790A2 | 12/1987 | European Pat. Off. . |
| 0342369A2 | 11/1989 | European Pat. Off. . |
| 0430663A1 | 11/1989 | European Pat. Off. . |
| 64-51045 | 2/1989 | Japan . |
| 64-225458 | 9/1989 | Japan . |
| 1-265852 | 10/1989 | Japan . |
| 1-104259 | 4/1990 | Japan . |

OTHER PUBLICATIONS

T. Koulourides, R. Bodden, S. Keller, L. Manson-Hing, J. Lastra and T. Housch, *Cariogenicity of Nine Sugars Tested with an Intraoral Device in Man* (1976), pp. 427-441.

*Primary Examiner*—Jeanette Hunter
*Attorney, Agent, or Firm*—Willian Brinks Hofer Gilson & Lione

[57] ABSTRACT

A chewing gum formulation to fight cavities comprises sufficient erythrose to give the chewing gum anti-caries properties. Also disclosed is a method of reducing or preventing dental caries by inhibiting the growth of *Streptococcus mutans* in the presence of fermentable carbohydrates in the mouth. This method comprises contacting the teeth with chewing gum containing erythrose, wherein the erythrose is present in sufficient quantity to give the chewing gum anti-caries properties.

10 Claims, No Drawings

COMPOSITION OF ANTI-CAVITY CHEWING GUM AND METHOD OF FIGHTING TOOTH DECAY BY USING ERYTHROSE AS ANTICARIES AGENT

BACKGROUND OF THE INVENTION

This invention relates to a method for preventing or reducing dental caries wherein the carbohydrate erythrose is employed in chewing gum to inhibit growth of Streptococcus mutans ("S. mutans") in the mouth. The present invention also relates to chewing gum formulations containing erythrose.

Foods containing natural sugars such as sucrose and dextrose have long been recognized as a major contributing cause of dental caries. The sugars are easily utilizable sources of nutrition for bacteria, specifically S. mutans found in the mouth. This bacteria is also responsible for the formation of plaque. S. mutans ferments residual sugar, thereby producing acids that dissolve the minerals of the teeth.

In recent years, certain anti-cariogenic substances have been incorporated into chewing gum and other orally-usable products. For example, U.S. Pat. No. 4,390,523, issued Jun. 28, 1983, to Huchette et al., teaches the substitution of sorbose for sucrose as a sweetener in chewing gum in order to reduce the production of fermentation acids in the mouth.

U.S. Pat. Nos. 4,457,921, issued Jul. 3, 1984, and 4,508,713 issued Apr. 2, 1985, both to Stroz et al., teach a method for treating teeth with hydrogenated starch hydrolysate, in conjunction with sucrose, in a chewing gum composition, in order to reduce dental caries.

U.S. Pat. No. 4,374,122, issued Feb. 15, 1983, also to Stroz et al., teaches the use of a compound comprising 3,4-dihydro-6-methyl-1,2,3-oxathiazine-4-one-2,2-dioxide, or the sodium, ammonium, potassium or calcium salts thereof, in an orally-usable carrier, including chewing gum, in order to reduce dental caries.

U.S. Pat. No. 4,518,581, issued May 21, 1985, to Miyake et al., teaches the use of a substance selected from the group consisting of isomaltosyl mono-, di- and tri-glucoses, and reduction products thereof, in orally-usable products including chewing gum in order to reduce dental caries.

U.S. Pat. No. 4,714,612, issued Dec. 22, 1987, to Nakamura et al., teaches the use of γ-globulin in chewing gum to combat Bacteroides gingivalis from colonizing in the mouth.

European Patent Application 0 342 369 A2, filed by Lembke et al. and published November 23, 1989, in the name of Biodyn AG, teaches the use of galactose in numerous orally-usable products, including chewing gum, in order to protect against dental caries.

In U.S. Pat. No. 3,429,716, issued Feb. 25, 1969, to Andrews, erythrose is used to retard the oxidation of food and stabilize anhydrous food products including chewing gum. However, the erythrose concentration is well below the levels mentioned herein, and there is no teaching in the Andrews patent regarding anti-cariogenic properties.

In an effort to reduce dental caries, artificial sweeteners and non-fermentable carbohydrates such as polyols have been used in place of the sugars which are used to give bulk to chewing gum. However, all polyols have the disadvantage of causing gastrointestinal disturbances if consumed in too great a quantity. It would be advantageous to be able to use a carbohydrate or carbohydrate-like compound as a bulking agent in chewing gum that would not contribute to dental caries or cause gastrointestinal disturbances.

SUMMARY OF THE INVENTION

It has been surprisingly found that the carbohydrate erythrose inhibits bacterial growth and may thus be used in chewing gum and confections to reduce the incidence of dental caries. Amounts of erythrose in a chewing gum formula sufficient to inhibit S. mutans may reduce the development of dental caries.

In accordance with one aspect of the present invention, there is provided a chewing gum formulation containing an amount of erythrose effective to give the chewing gum anti-caries properties, preferably at least 2.0% by weight erythrose, and more preferably from about 2.5 to about 40% by weight erythrose. Even more preferably, the weight range of erythrose is from about 3 to about 35%, and still more preferably, from about 5 to about 30%.

The present invention also provides a method of treating teeth to reduce or prevent dental caries by gradually administering erythrose over a period of time. This is accomplished by using a chewing gum formulation containing an amount of erythrose effective to give the gum anti-caries properties.

The method described above preferably utilizes a chewing gum formulation containing at least 2.0% by weight erythrose, more preferably from about 2.5 to about 40% by weight erythrose. Even more preferably, the method utilizes a chewing gum formulation wherein the weight range of erythrose is from about 3 to about 35%, and still more preferably, from about 5 to about 30%.

DETAILED DESCRIPTION

Erythrose is a 4-carbon carbohydrate (aldotetrose), and is one of the simple aldoses. It is a syrupy material and is very soluble in water. It has an empirical formula of $C_4H_8O_4$, and a molecular weight of 120.10. Its structure is:

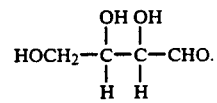

Erythrose exists in D and L optical isomers, 15 both of which (and their mixtures) are useful in the present invention. The D- isomer is preferred, since it is readily available commercially as an 85% solution in water.

In vitro tests which are part of the present invention, and which are described in more detail below, indicate that erythrose inhibits growth of S. mutans. An initial test revealed the surprising effectiveness of a 5% solution of erythrose over negative controls of xylose solutions. Later tests showed that erythrose was effective in a 2% solution, and even for a short term, in a 0.5% solution. These tests show erythrose was effective in inhibiting the growth of S. mutans, and is thus bacteriostatic. In some instances the population of S. mutans decreased, indicating that bacteria may be killed by erythrose. This killing action is described as bactericidal.

Chewing gum is used to administer erythrose into the mouth. In general, a chewing gum composition comprises a water soluble bulk portion; a water insoluble, chewable, chewing gum base portion; and, typically, water insoluble flavor ingredients. The water soluble bulk portion, which in the case of the invention includes erythrose, dissolves with a portion of the flavor over a period of time, while the consumer chews the gum. The gum base portion is retained in the mouth throughout the chew.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate, ester gums and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candelilla, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes from about 5 to about 95% by weight of the chewing gum, more typically from about 10 to about 50% by weight of the chewing gum, and most commonly from about 20 to about 35% by weight of the chewing gum.

The water soluble portion of the chewing gum may include softeners, bulk sweeteners, high intensity sweeteners, flavoring agents and combinations thereof. Softeners such as glycerin are added to the chewing gum in order to optimize the chewability and mouth feel of the gum. The softeners, which are also known as plasticizers or plasticizing agents, constitute from about 0.1 to about 15% by weight of the chewing gum.

Aqueous sweetener solutions such as those containing sorbitol, hydrogenated starch hydrolysates, syrups of xylitol, maltitol, hydrogenated isomaltulose and other polyols, corn syrup and combinations thereof, may also be used as softeners and binding agents in the chewing gum.

Bulk sweeteners constitute from about 5 to about 90% by weight of the chewing gum, more typically from about 20 to about 80% by weight of the chewing gum and most commonly from about 30 to about 60% by weight of the chewing gum.

Sweeteners contemplated by the present invention for use in chewing gum include both sugar and sugarless components. Sugar sweeteners generally include saccharide-containing components commonly known in the chewing gum art. These sugar sweeteners include but are not limited to sucrose, dextrose, maltose, dextrin, dried invert sugar, fructose, levulose, galactose, corn syrup solids and the like, alone or in any combination.

Any combination of sugar and/or sugarless sweeteners may be employed in the chewing gum. Further, a sweetener may be present in a chewing gum in whole or in part as a water soluble bulking agent. It is a portion of the usual sweetener/bulking agent which is replaced with erythrose, in the quantities described above. In addition, the softener may be combined with a sweetener such as an aqueous sweetener solution.

Bulk sweeteners preferably include sugarless sweeteners and components. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, hydrogenated isomaltulose, and the like, alone or in combination.

High intensity sweeteners may also be present and are commonly used with sugarless sweeteners. When used, high intensity sweeteners typically constitute from about 0.001 to about 5% by weight of the chewing gum, preferably from about 0.01 to about 1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

The flavoring agent should generally be present in the chewing gum in an amount within the range of from about 0.1 to about 15% by weight of the chewing gum, preferably from about 0.2 to about 5% by weight of the chewing gum, most preferably from about 0.5 to about 3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the chewing gum. Natural and artificial flavoring agents may be combined in any sensorially acceptable fashion.

Optional ingredients such as colors, emulsifiers, pharmaceutical agents and additional flavoring agents may also be included in chewing gum.

In general, chewing gum is manufactured by sequentially adding the various chewing gum ingredients to any commercially available mixer known in the art. After the ingredients have been thoroughly mixed, the gum mass is discharged from the mixer and shaped into the desired forms such as by rolling into sheets and cutting into sticks, extruding into chunks, or casting into pellets. Generally, the ingredients are mixed by first melting the gum base and adding it to the running mixer. The base may also be melted in the mixer itself. Color may also be added at this time. A softener such as glycerin may then be added next along with syrup and a portion of bulking agent, which may include erythrose. Further portions of the bulking agents, including any remaining erythrose, may then be added to the mixer.

The present invention contemplates the blending of erythrose into the chewing gum, thus allowing its gradual release into the mouth as the gum is chewed. Erythrose may be mixed with the chewing gum ingredients at any time during the manufacturing process, but preferably it is mixed in with the bulking agent. Although in a lesser quantity, erythrose may also be coated on the outside of the gum.

The following examples are not to be construed as limitations upon the present invention, but are included merely as an illustration of various embodiments.

EXAMPLES

Example 1: Testing 5% Erythrose

This example demonstrates that erythrose effectively inhibits or kills *S. mutans*.

Five gram samples of D-erythrose (85% solution in water from Aldrich Chemical Co., Milwaukee, Wis.), D,L-glyceraldehyde (Aldrich, 98% purity), xylose (Aldrich) and xylose (Roquette) were obtained. Five percent test solutions of each were prepared from 10% stock solutions (1 gram of sample per 10 grams of solution) by diluting 1:1 (1 gram of 10% solution per 1 gram of diluent) with sterile distilled water for the Paper Disc assay and Trypticase Soy Broth ("TSB") for the broth assay.

An *S. mutans* culture (ATCC 25175) was prepared with TSB and incubated 24 hours at 35° C. Paper Disc Inhibition tests were performed, wherein spread plates were prepared by inoculating each Typtone Glucose Yeast Extract agar plate (TGY) with 0.1 ml of a 1:1000 dilution of the 24-hour *S. mutans* culture. The plate was then allowed to dry for 30 minutes. For each test solution, two 12.5 mm sterile discs were saturated with 50 microliters of solution and each was placed in the center of an inoculated TGY plate. Two additional discs were saturated with sterile distilled water to serve as negative controls. These plates were incubated for 24 hours at 35° C. After incubation, the plates were observed for clearing zones around the discs, and the diameter of the zone was measured.

After 24 hours of incubation, there was no visible zone of inhibition around the discs with 5.0% erythrose. (See Table 1.) However, strong positive evidence of the inhibiting effect of erythrose on *S. mutans* is illustrated below in the tests conducted in TBS.

TABLE 1

Results of Disc Inhibition Tests of Four Carbohydrates on *S. mutans*

| Sample | Plate | Zone Diameter (mm)* |
|---|---|---|
| Erythrose | 1 | <12.5 |
| Erythrose | 2 | <12.5 |
| Glyceraldehyde | 1 | 39 |
| Glyceraldehyde | 2 | 36 |
| Xylose (Aldrich) | 1 | <12.5 |
| Xylose (Aldrich) | 2 | <12.5 |
| Xylose (Roquette) | 1 | <12.5 |
| Xylose (Roquette) | 2 | <12.5 |

*Each result is the average of 3 measurements.

Inhibition in TSB was also tested. An overnight culture of *S. mutans* was diluted 1:1000. Then 0.1 ml of this culture was added to tubes containing 5.0% of glyceraldehyde, erythrose or xylose in TSB. The tubes were incubated in a 35° C water bath. After 0, 4, 8, 24, and 48 hours in the water bath, serial dilutions of the tube solutions were plated. A tube prepared without carbohydrates was also used as a control. The results are expressed in Table 2 as the number of viable colony forming units per milliliter of solution (cfu/ml).

Initial plate counts for *S. mutans* ranged from 23,000 cfu/ml to 60,000 cfu/ml (Table 2). After 4 hours of incubation at 35° C., counts decreased to <10 cfu/ml in the erythrose solution, and remained under 10 cfu/ml through the 48-hour plating. After 8 hours of incubation at 35° C., counts increased between 5 and 12fold for the no-carbohydrate control and xylose. After 24 hours of incubation, counts increased between 2,300 and 10,000-fold, and remained relatively constant through the 48 hour plating.

These data indicate that growth rates in the tubes containing xylose did not vary significantly from growth rates in tubes containing straight TSB. In contrast, in tubes containing erythrose, *S. mutans* died. These results support the conclusions that xylose has no inhibitory effect on *S. mutans*, but that erythrose effectively inhibits or kills *S. mutans*.

TABLE 2

Results of Inhibition Tests of Four Carbohydrates on *S. mutans*

| Time (hours) | Aerobic Plate Count (cfu/ml) |
|---|---|
| Control | |
| 0 | 60,000 |
| 4 | 69,000 |
| 8 | 120,000 |
| 24 | 1,200,000,000 |
| 48 | 1,100,000,000 |
| Erythrose | |
| 0 | 36,000 |
| 4 | <10 |
| 8 | <10 |
| 24 | <10 |
| 48 | <10 |
| Glyceraldehyde | |
| 0 | 23,000 |
| 4 | <10 |
| 8 | <10 |
| 24 | <10 |
| 48 | <10 |
| Xylose (Aldrich) | |
| 0 | 39,000 |
| 4 | 110,000 |
| 8 | 200,000 |
| 24 | 460,000,000 |
| 48 | 570,000,000 |
| Xylose (Roquette) | |
| 0 | 26,000 |
| 4 | 123,000 |
| 8 | 290,000 |
| 24 | 680,000,000 |
| 48 | 400,000,000 |

Example 2: Testing 0.1%, 0.5%, and 2.0% Erythrose

This example demonstrates the dose-efficacy relationship between the concentration of inhibitory carbohydrate and bacterial multiplication. Using the same methodology as above, 5 grams of D-erythrose and 10 grams of D,L-glyceraldehyde were dissolved and diluted to obtain four concentrations ranging between 0.10% and 2.0%. This was done by preparing 10% stock solutions and diluting them according to the following schedule:

2.0 grams of 10% solution was diluted with 8.0 grams of diluent to yield 2.0% solution.

1.0 gram of 10% solution was diluted with 9.0 grams of diluent to yield 1.0% solution.

2.0 grams of 2% solution was diluted with 6.0 grams of diluent to yield 0.5% solution.

1.0 gram of 1% solution was diluted with 9.0 grams of diluent to yield 0.1% solution.

Water was the diluent for the disc assay and TSB was the diluent for the broth assay. Two strains of *S. mutans* (ATCC 25175 and ATCC 27351) were prepared in TSB incubated 24 hours at 35° C. before inhibition testing.

In the Disc Inhibition test, after 24 hours, incubation there was, as with 5.0% erythrose solutions in Example 1, no zone of inhibition visible on plates containing discs with 2.0% erythrose (Table 3). Again, as in Example 1, the results in TSB also showed inhibition. Initial plate counts in the control and erythrose plates for ATCC 25175 ranged from 3,500 cfu/ml (0.10% erythrose, Table 4) to 4,400 cfu/ml (control, Table 5); and for ATCC 27351, from 1,400 cfu/ml (0.10% erythrose) to 2,100 cfu/ml (2.00% erythrose). After 4 hours of incubation at 35° C., counts decreased to <10 cfu/ml for both cultures in TABLE 3
Results of Disc Inhibition Tests on S. mutans

| Sample | Plate | Zone Diameter (mm)* (ATCC 25175) | Zone Diameter (mm)* (ATCC 27351) |
|---|---|---|---|
| 2.0% Erythrose | 1 | <12.5 | <12.5 |
|  | 2 | <12.5 | <12.5 |
| 0.5% Erythrose | 1 | <12.5 | <12.5 |
|  | 2 | <12.5 | <12.5 |
| 0.1% Erythrose | 1 | <12.5 | <12.5 |
|  | 2 | <12.5 | <12.5 |
| 2.0% Glyceraldehyde | 1 | 22 | 17 |
|  | 2 | 18 | 22 |
| 0.5% Glyceraldehyde | 1 | 12.5 | <12.5 |
|  | 2 | <12.5 | <12.5 |
| 0.1% Glyceraldehyde | 1 | <12.5 | <12.5 |
|  | 2 | <12.5 | <12.5 |

*Each result is the average of 3 measurements.

2.0% erythrose solution, and remained below 10 cfu/ml through the 48 hour plating. The three tubes containing TSB broth with 0.5% erythrose exhibited inhibition between the 8 and 24 hour platings, but showed increased growth by the 48 hour plating.

These data indicate that tubes containing 0.5% erythrose showed some short term inhibition in TSB. The effect was temporarily bacteriostatic as there was little change in the viable count. In tubes containing 2.0% erythrose, S. mutans died. This level of erythrose was bactericidal in broth, but only the 2.0% glyceraldehyde was bactericidal by disc assay.

TABLE 4
Results of Broth Inhibition Test for Erythrose on S. mutans

| Time (Hours) | % Erythrose | | |
|---|---|---|---|
|  | 0.10 | 0.50 | 2.00 |
| ATCC 25175 | | | |
| 0 | 3,500 | 4,100 | 3,800 |
| 4 | 6,100 | 5,500 | <10 |
| 8 | 5,100 | 2,300 | <10 |
| 24 | 210,000,000 | 50 | <10 |
| 48 | 48,000,000 | 45,000 | <10 |
| ATCC 27351 | | | |
| 0 | 1,400 | 2,000 | 2,100 |
| 4 | 1,300 | 2,300 | <10 |
| 8 | 3,800 | 1,800 | <10 |
| 24 | 210,000,000 | 20 | <10 |
| 48 | 48,000,000 | 730 | <10 |

TABLE 5
Results of Broth Inhibition Test for Glyceraldehyde on S. mutans

| Time (Hours) | % Glyceraldehyde | | | |
|---|---|---|---|---|
|  | 0.00 (Control) | 0.10 | 0.50 | 2.00 |
| ATCC 25175 | | | | |
| 0 | 4,400 | 3,700 | 3,400 | 3,300 |
| 4 | 8,100 | 2,800 | <10 | <10 |
| 8 | 25,000 | 900 | <10 | <10 |
| 24 | 6,800,000,000 | 1,200 | <10 | <10 |
| 48 | 270,000,000 | 170,000 | <10 | <10 |
| ATCC 27351 | | | | |
| 0 | 1,900 | 2,100 | 2,400 | 1,900 |
| 4 | 3,600 | 1,600 | <10 | <10 |
| 8 | 6,800 | 630 | <10 | <10 |
| 24 | 5,300,000,000 | 50 | <10 | <10 |
| 48 | 100,000 | 270 | <10 | <10 |

The environment of the mouth, as erythrose is gradually released from the chewing gum into the saliva, is expected to simulate the environment in the TSB test, and thus inhibit S. mutans.

Example 3: Preparation of a Sugar-Free Chewing Gum

A spearmint flavored sugar-free chewing gum can be made with the following ingredients:

|  | % |
|---|---|
| Gum base | 25.0 |
| Mannitol | 8.0 |
| Sorbitol | 41.4 |
| Softener | 0.2 |
| Glycerin | 8.0 |
| Flavor | 1.4 |
| Erythrose | 16.0 |
|  | 100.0% |

The chewing gum can be prepared by softening the gum base at about 65° C. (150° F.) and adding it to the mixer with the sorbitol. After 2 minutes of mixing, mannitol is added, after which erythrose is added, followed by glycerin. These ingredients are mixed a total of 6 minutes, then flavor is added and mixed another 5 minutes. The gum is discharged, rolled thin, and cut into sticks. The chewing gum product will have a pleasant taste and inhibit growth of S. mutans in the mouth.

Example 4: Preparation of a Sugared Chewing Gum

A peppermint flavored gum can be prepared using the following ingredients:

|  | % |
|---|---|
| Gum base | 20.0 |
| 45 Baumé corn syrup | 17.0 |
| Powdered sugar | 30.0 |
| Dextrose | 10.0 |
| Peppermint flavor | 1.0 |
| Erythrose | 20.0 |
| Glycerin | 2.0 |
|  | 100.0% |

The chewing gum can be prepared as described for Example 3. The chewing gum product will have a pleasant taste and inhibit growth of S. mutans in the mouth.

Those skilled in the art will recognize that variations of the above described procedure may be followed. It is to be understood that an equivalent of changes and modifications of the embodiments described above are also contemplated by the present invention. For example, it will be apparent to those skilled in the art, in light of the present disclosure, that equivalents of erythrose, such as various erythrose isomers as erythrulose and threose, or erythrose derivatives like salts of erythrose- 4-phosphate and erythrose-4-phosphate diethyl acetal, may be substituted in whole or in part for erythrose itself, within the spirit of the invention.

I claim:

1. A chewing gum formulation comprising
   (a) a water soluble bulk portion, which comprises from about 5 to about 90% by weight of the gum of bulk sweeteners, and from about 0.01 to about 15% softeners;
   (b) from about 5 to about 95% by weight of the gum of a water insoluble chewing gum base portion; and
   (c) from about 0.1 to about 15% by weight of the gum of water insoluble flavor ingredients;
   the water soluble bulk portion comprising sufficient erythrose to give the chewing gum anticaries properties.

2. The chewing gum as set forth in claim 1 wherein the chewing gum comprises at least about 2.0% erythrose by weight.

3. The chewing gum as set forth in claim 1 wherein the chewing gum comprises from about 2.5 to about 40% erythrose by weight.

4. The chewing gum as set forth in claim 1 wherein the chewing gum comprises from about 3 to about 35% erythrose by weight.

5. The chewing gum as set forth in claim 1 wherein the chewing gum comprises from about 5 to about 30% erythrose by weight.

6. A method of reducing or preventing dental caries by inhibiting growth of *Streptococcus mutans* in the presence of fermentable carbohydrates in the mouth, which method comprises contacting the teeth with chewing gum containing erythrose, wherein the erythrose is present in quantity sufficient to give the chewing gum anti-caries properties.

7. The method in claim 6 wherein the chewing gum contains at least about 2.0% erythrose by weight.

8. The method in claim 6 wherein the chewing gum contains from about 2.5 to about 40% erythrose by weight.

9. The method in claim 6 wherein the chewing gum contains from about 3 to about 35% erythrose by weight.

10. The method in claim 6 wherein the chewing gum contains from about 5 to about 30% erythrose by weight.

* * * * *

UNITED STATES PATENT AND TRADEMARK OFFICE
CERTIFICATE OF CORRECTION

PATENT NO. : 5,294,449
DATED : March 15, 1994
INVENTOR(S) : Michael J. Greenberg It is certified that error appears in the above-indentified patent and that said Letters Patent is hereby corrected as shown below:

In column 2, line 49, delete "15".

In column 5, line 66, delete "12fold" and substitute therefor --12-fold--.

Signed and Sealed this

Twenty-seventh Day of September, 1994

Attest:

BRUCE LEHMAN

Attesting Officer

Commissioner of Patents and Trademarks